United States Patent
Tang

(10) Patent No.: US 11,006,370 B2
(45) Date of Patent: May 11, 2021

(54) UPLINK POWER CONTROL METHOD, DEVICE AND SYSTEM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 13 days.

(21) Appl. No.: 16/591,500

(22) Filed: Oct. 2, 2019

(65) Prior Publication Data

US 2020/0037258 A1    Jan. 30, 2020

Related U.S. Application Data

(63) Continuation of application No. PCT/CN2017/080262, filed on Apr. 12, 2017.

(51) Int. Cl.
*H04W 52/14* (2009.01)
*H04W 24/10* (2009.01)
(Continued)

(52) U.S. Cl.
CPC ......... *H04W 52/146* (2013.01); *H04L 5/0051* (2013.01); *H04L 25/0226* (2013.01);
(Continued)

(58) Field of Classification Search
CPC . H04B 7/0617; H04L 25/0226; H04L 5/0023; H04L 5/0048; H04L 5/0051;
(Continued)

(56) References Cited

U.S. PATENT DOCUMENTS 9,179,419 B2 * 11/2015 Park ................. H04L 5/0048
9,497,713 B2 * 11/2016 Yang ................ H04W 52/242
(Continued)

FOREIGN PATENT DOCUMENTS

| CN | 102056178 A | 5/2011 |
| CN | 102647794 A | 8/2012 |
| WO | 2018187977 A1 | 10/2018 |

OTHER PUBLICATIONS

The EESR of corresponding European application No. 17905866.4, dated Mar. 20, 2020.
(Continued)

*Primary Examiner* — Ahmed Elallam
(74) *Attorney, Agent, or Firm* — Ladas & Parry, LLP

(57) ABSTRACT

The present disclosure discloses an uplink power control method, a device and a system. A terminal device may first determine a target downlink signal for performing a downlink path loss estimation, perform the downlink path loss estimation based on the determined target downlink signal to obtain a downlink path loss estimate, then can determine transmitting power of an uplink signal according to the downlink path loss estimate, and transmit the uplink signal according to the determined transmitting power, thereby implementing uplink power control in a beamforming scenario, and improving the system performance.

20 Claims, 3 Drawing Sheets

(51) Int. Cl.
*H04W 52/24* (2009.01)
*H04L 25/02* (2006.01)
*H04L 5/00* (2006.01)

(52) U.S. Cl.
CPC ......... *H04W 24/10* (2013.01); *H04W 52/241* (2013.01); *H04W 52/242* (2013.01)

(58) Field of Classification Search
CPC ... H04W 24/10; H04W 52/00; H04W 52/146; H04W 52/241; H04W 52/242; H04W 52/245; H04W 52/246
See application file for complete search history.

(56) References Cited

U.S. PATENT DOCUMENTS

| | | | | |
|---|---|---|---|---|
| 9,642,114 | B2* | 5/2017 | Fong | H04W 76/40 |
| 10,602,456 | B2* | 3/2020 | Li | H04W 52/146 |
| 2004/0170132 | A1* | 9/2004 | Shin | H04W 52/10 370/294 |
| 2006/0270434 | A1 | 11/2006 | Iacono | |
| 2013/0142113 | A1* | 6/2013 | Fong | H04W 68/02 370/328 |
| 2013/0272158 | A1 | 10/2013 | Park et al. | |
| 2014/0177467 | A1* | 6/2014 | Kim | H04W 52/242 370/252 |
| 2014/0247796 | A1 | 9/2014 | Ouchi et al. | |
| 2015/0304960 | A1* | 10/2015 | Yang | H04W 52/242 370/252 |
| 2018/0027437 | A1* | 1/2018 | Vitthaladevuni | H04W 52/343 370/252 |
| 2018/0048358 | A1* | 2/2018 | Li | H04B 7/0617 |
| 2019/0090205 | A1* | 3/2019 | Gong | H04B 17/309 |
| 2019/0090263 | A1* | 3/2019 | Luo | H04W 72/1236 |
| 2019/0349864 | A1* | 11/2019 | Zhang | H04W 52/325 |
| 2019/0349868 | A1* | 11/2019 | Zhang | H04W 52/36 |
| 2019/0387479 | A1* | 12/2019 | Gong | H04W 52/242 |
| 2020/0022090 | A1* | 1/2020 | Li | H04W 52/242 |
| 2020/0059866 | A1* | 2/2020 | Takeda | H04W 52/06 |
| 2020/0112993 | A1* | 4/2020 | Tsai | H04W 72/042 |
| 2020/0358568 | A1* | 11/2020 | Nishio | H04W 24/08 |

OTHER PUBLICATIONS

Alcatel-Lucent Shanghai Bell et al:"PUCCH Power Control for UL CoMP", 3GPP Draft; R1-120502, 3rd Generation Partnership Project (3GPP), Mobile Competence Centre; 650, Route Des Lucioles; F-06921 Sophia-Antipolis Cedex; France, vol. RAN WG1, No. Dresden, Germany; Feb. 6, 2012-Feb. 10, 2012 Feb. 1, 2012(Feb. 1, 2012), XP050563223.

3GPP TS 36.213 V11.0.0, 3rd Generation Partnership Project; Technical Specification Group Radio Access Network; Evolved Universal Terrestrial Radio Access (E-UTRA); Physical layer procedures (Release 11).

Huawei, HiSilicon, 3GPP TSG RAN WG1 Meeting #88bis R1-1704228; Detailed considerations on UL power control design for NR, Spokane, USA, Apr. 3-7, 2017.

International Search Report in international application No. PCT/CN2017/080262, dated Dec. 20, 2017.

The first Office Action of corresponding Indian application No. 201917043988, dated Dec. 8, 2020.

The first Office Action of corresponding European application No. 17905866.4, dated Jan. 29, 2021.

The first Office Action of corresponding Korean application No. 10-2019-7032496, dated Sep. 17, 2020.

* cited by examiner

UPLINK POWER CONTROL METHOD, DEVICE AND SYSTEM

CROSS-REFERENCE TO RELATED APPLICATIONS

This application is a continuation of International Application No. PCT/CN2017/080262, filed on Apr. 12, 2017, which is hereby incorporated by reference in its entirety.

TECHNICAL FIELD

The present disclosure relates to the radio network technologies, and in particular, to an uplink power control method, a device, and a system.

BACKGROUND

In a traditional Long Term Evolution (LTE) system, for determining transmitting power of an uplink signal, a terminal device needs to perform a downlink path loss estimation based on a downlink signal, and determine the transmitting power of the uplink signal after performing path loss compensation according to a downlink path loss.

The downlink signal used for the downlink path loss estimation in the LTE system does not perform narrowband transmit or receive beamforming, and thus an uplink path loss can be estimated using the obtained downlink path loss.

In a New Radio (NR) system, narrowband beamforming is carried out in transmission of the uplink and downlink signals, so the uplink and downlink path losses are likely to be inconsistent, that is, there may be a big difference between the downlink path loss obtained based on the downlink signal and the actual uplink path loss, and the downlink path loss obtained based on the downlink signal may not be directly used for uplink path loss compensation, i.e. cannot be directly used for uplink power control.

Therefore, how to perform uplink power control in a beamforming scenario will be an urgent problem to be solved.

SUMMARY

In view of this, the present disclosure provides an uplink power control method, a device, and a system.

The specific technical solutions are as follows.

An uplink power control method includes:

determining, by a terminal device, a target downlink signal for performing a downlink path loss estimation;

performing, by the terminal device, the downlink path loss estimation based on the target downlink signal to obtain a downlink path loss estimate;

determining, by the terminal device, transmitting power of an uplink signal according to the downlink path loss estimate; and transmitting, by the terminal device, the uplink signal according to the transmitting power.

An uplink power control method includes:

transmitting, by a network-side device, a target downlink signal, so that a terminal device performs a downlink path loss estimation based on the target downlink signal and determines transmitting power of an uplink signal according to a result of the downlink path loss estimation.

A terminal device includes: a downlink signal determining unit, a downlink path loss estimating unit, a transmitting power determining unit, and an uplink signal transmitting unit;

the downlink signal determining unit is configured to determine a target downlink signal for performing a downlink path loss estimation;

the downlink path loss estimating unit is configured to perform the downlink path loss estimation based on the target downlink signal to obtain a downlink path loss estimate;

the transmitting power determining unit is configured to determine, according to the downlink path loss estimate, transmitting power of an uplink signal;

and the uplink signal transmitting unit is configured to transmit the uplink signal according to the transmitting power.

A network-side device includes: a downlink signal transmitting unit;

the downlink signal transmitting unit is configured to transmit a target downlink signal, so that a terminal device performs a downlink path loss estimation based on the target downlink signal and determines transmitting power of an uplink signal according to a result of the downlink path loss estimation.

An uplink power control system includes:

the terminal device as described above, and the network-side device as described above.

Based on the foregoing description, it can be seen that, by adopting the solutions of the present disclosure, a terminal device may first determine a target downlink signal for performing a downlink path loss estimation, perform the downlink path loss estimation based on the determined target downlink signal to obtain a downlink path loss estimate, and then determine transmitting power of an uplink signal according to the downlink path loss estimate, and transmit the uplink signal according to the determined transmitting power, thus uplink power control in a beamforming scenario is implemented, and the system performance is thereby improved.

DESCRIPTION OF EMBODIMENTS

In order to make the purposes, technical solutions and advantages of the disclosure clearer, the present disclosure will be described in detail below with reference to the drawings and specific embodiments.

Figure 1:
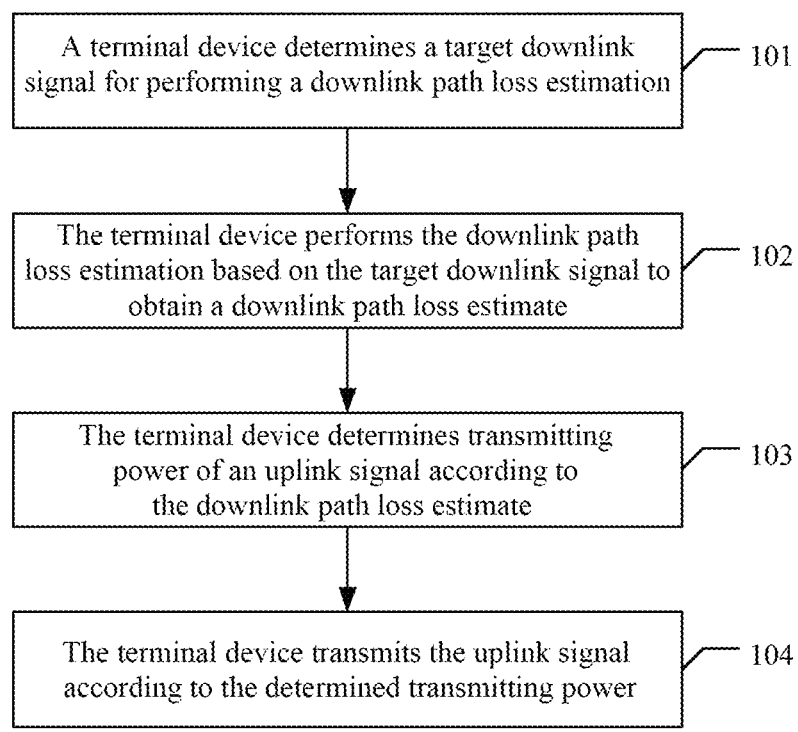
FIG. 1 is a flowchart of an embodiment of an uplink power control method according to the present disclosure.

FIG. 1 is a flowchart of an embodiment of an uplink power control method according to the present disclosure. As shown in FIG. 1, the following specific implementations are included.

In 101, a terminal device determines a target downlink signal for performing a downlink path loss estimation;

in 102, the terminal device performs the downlink path loss estimation based on the target downlink signal to obtain a downlink path loss estimate;

in 103, the terminal device determines, according to the downlink path loss estimate, transmitting power of an uplink signal; and in 104, the terminal device transmits the uplink signal according to the determined transmitting power.

The target downlink signal may include: a Channel State Information Reference Signal (CSI-RS), a Mobility Reference Signal (MRS), a Synchronous Signal (SS), a Phase Tracking Reference Signal (PTRS), a Demodulation Reference Signal (DMRS), and the like.

The uplink signal may include: a Physical Uplink Shared Channel (PUSCH) signal, a Physical Uplink Control Channel (PUCCH) signal, a Sounding Reference Signal (SRS), and the like.

Different uplink signals can correspond to different target downlink signals.

That is to say, in an actual application, when the terminal device determines the transmitting power of different uplink signals, different target downlink signals may be used for downlink path loss estimation and the like.

For example, the PUSCH signal and the PUCCH signal may respectively correspond to different target downlink signals, for example, which correspond to different CSI-RS resources.

The specific implementation of each part in the embodiment shown in FIG. 1 will be described in detail below.

I) A terminal device determines a target downlink signal for performing a downlink path loss estimation In an embodiment, the terminal device may first receive first indication information from a network side before determining the target downlink signal for performing the downlink path loss estimation, where the first indication information is used to indicate whether the terminal device uses the downlink path loss estimation to obtain transmitting power of an uplink signal, and if the first indication information indicates that the terminal device uses the downlink path loss estimation to obtain transmitting power of the uplink signal, the terminal device may further determine the target downlink signal for performing the downlink path loss estimation.

For example, the network side may indicate, by the first indication information, whether the terminal device uses an uplink path loss estimation or the downlink path loss estimation to obtain the transmitting power of the uplink signal.

An uplink path loss estimate is usually indicated by the network side to the terminal device, and a downlink path loss estimate is measured by the terminal device. If the network side determines that uplink and downlink path losses are reciprocal, the terminal device may be instructed to use the downlink path loss estimation to obtain the transmitting power of the uplink signal.

As another example, the network side may indicate, by the first indication information, according to actual conditions, whether the terminal device can use the downlink path loss estimation to obtain the transmitting power of the uplink signal. If the first indication information indicates that the terminal device can use the downlink path loss estimation to obtain the transmitting power of the uplink signal, the terminal device may use the downlink path loss estimation to obtain the transmitting power of the uplink signal, i.e. to update the transmitting power of the uplink signal. Otherwise, the terminal device may transmit the uplink signal based on the previously determined transmitting power, that is, the transmitting power of the uplink signal is not updated until subsequently the network side notifies the terminal device that an update can be performed.

A mode in which the terminal device determines the target downlink signal for performing the downlink path loss estimation may include at least the following two types.

1) Mode 1

The terminal device receives second indication information from the network side, and determines the target downlink signal for performing the downlink path loss estimation according to the second indication information.

The second indication information may carry index information of the target downlink signal, for indicating an index of the target downlink signal in a plurality of downlink signals that are pre-configured, so that the terminal device can know the target downlink signal for performing the downlink path loss estimation according to the index information.

The second indication information may be carried by a high-layer signaling, or may be carried by a Downlink Control Information (DCI) signaling.

For example, the network side may pre-configure multiple CSI-RS resources through the high-layer signaling, and indicate indexes of one or more CSI-RS resources for performing the downlink path loss estimation.

As another example, the network side may transmit multiple synchronous signal blocks (SS block) and indicate an index of an SS block for performing the downlink path loss estimation among them, and the terminal device may perform the downlink path loss estimation based on a synchronous signal in the SS block corresponding to the index or a DMRS of a Physical Broadcast Channel (PBCH) in the SS block.

The network side may indicate a plurality of target downlink signals for performing the downlink path loss estimation, and the plurality of target downlink signals may be downlink signals of a same type and with different configurations, such as CSI-RSs or SSs, and may also include signals of different types, such as CSI-RS and MRS.

2) Mode 2

The terminal device may measure M candidate downlink signals, and select N candidate downlink signals therefrom as target downlink signals according to a measurement result.

M is a positive integer greater than one, and N is a positive integer less than or equal to M. Specific values of M and N may be determined according to actual needs. In an embodiment, N may have a value of 1.

The M candidate downlink signals may be multiple downlink signals pre-configured by the network side for performing the downlink path loss estimation, for example, multiple CSI-RS resources.

Alternatively, the M candidate downlink signals may be multiple downlink signals that are pre-agreed with the network side, for example, SSs in multiple SS blocks transmitted at locations of agreed resources.

The terminal device can measure receiving quality of the M candidate downlink signals respectively, and select the N candidate downlink signals with best receiving quality therefrom as the target downlink signals.

In an embodiment, the receiving quality may refer to Reference Signal Receiving Quality (RSRQ).

Alternatively, the terminal device may measure receiving power of the M candidate downlink signals respectively, and select the N candidate downlink signals with largest receiving power therefrom as the target downlink signals.

In an embodiment, the receiving power may refer to Reference Signal Receiving Power (RSRP).

After selecting the N candidate downlink signals as the target downlink signals, the terminal device may further report index information of the target downlink signals to the network side, so that the network side knows the selected target downlink signals.

For example, the network side pre-configures multiple CSI-RS resources, and the terminal device can report the index information of the CSI-RS resources for performing the downlink path loss estimation.

In addition, the terminal device may also report a measurement result of the target downlink signals to the network side while reporting the index information of the target downlink signals to the network side.

For example, the terminal device may report the index information of the target downlink signals and the RSRP measured based on the target downlink signals to the network side through the high-layer signaling.

Alternatively, the terminal device may report only the measurement result of the target downlink signals to the network side.

II) The terminal device performs the downlink path loss estimation based on the target downlink signal to obtain a downlink path loss estimate.

1) The terminal device can perform the downlink path loss estimation according to receiving power and transmitting power of the target downlink signal, to obtain the downlink path loss estimate.

For example, when the number of the target downlink signal is greater than one, the terminal device may calculate an average value of the receiving power of respective target downlink signals, and determine the downlink path loss estimate according to the average value and the transmitting power of each target downlink signal, or the terminal device may determine a path loss estimate corresponding to each target downlink signal according to the receiving power and the transmitting power of each target downlink signal, and average the path loss estimates corresponding to the respective target downlink signals to obtain the downlink path loss estimate.

When the number of the target downlink signal is equal to one, the terminal device may directly determine the downlink path loss estimate according to the receiving power and the transmitting power of the target downlink signal.

The transmitting power of the target downlink signal may be pre-notified by the network side to the terminal device through downlink signaling, for example, it is carried in configuration information of the CSI-RS resource and notified to the terminal device.

Generally, when the number of the target downlink signal is greater than one, the transmitting power of multiple target downlink signals are the same, and may be different if necessary.

The path loss estimate is usually expressed in dB. Assuming the receiving power is P1 and the transmitting power is P2, the path loss estimate can be expressed as:

$$PL(dB)=10*lg(P1/P2)(dB) \quad (1)$$

where PL is the path loss estimate.

2) The terminal device may also determine a receiving beam for receiving the target downlink signal according to a last determined beam for transmitting an uplink signal, and perform the downlink path loss estimation based on the received target downlink signal.

For example, the terminal device may use a beamforming weight used for last transmitting the uplink signal as a receiving beamforming weight for receiving the target downlink signal, and thereby measure the receiving power of the received target downlink signal to calculate the downlink path loss estimate.

The uplink signal may be an uplink signal in 103 and 104, or may be an uplink signal indicated by the network side to the terminal device.

As another example, the terminal device may also pre-determine a mapping relationship between a transmitting beam and a receiving beam, and determine the receiving beam according to the transmitting beam and the mapping relationship.

3) The terminal device may further determine, according to a transmitting beam used for transmitting a Sounding Reference Signal (SRS) on an SRS resource indicated by last received SRS Resource Indication (SRI) information, a receiving beam for receiving the target downlink signal, and perform the downlink path loss estimation based on the received target downlink signal.

The SRI is generally indicated to the terminal device by the network side through DCI scheduling uplink data transmission.

The SRI is used to indicate a target SRS resource among a plurality of SRS resources previously used by the terminal device for transmitting an SRS.

For example, the terminal device may determine, according to the SRI in the last received DCI scheduling uplink data, an SRS resource indicated by the SRI and the beamforming weight used for transmitting the SRS on the SRS resource, and use the weight as a receiving beamforming weight for receiving the target downlink signal, and thus measure the receiving power of the received target downlink signal to calculate the downlink path loss estimate.

4) The terminal device can also perform the downlink path loss estimation according to part of antenna ports of the target downlink signal.

For example, the downlink path loss estimation is performed according to one or two antenna ports of the target downlink signal, and specifically selecting which antenna ports may be determined according to actual needs.

III) The terminal device determines the transmitting power of the uplink signal according to the downlink path loss estimate.

After the downlink path loss estimate is obtained, in general, the terminal device can obtain the transmitting power of the uplink signal according to the following formula.

$$Pt=\min\{P\max, a*PL+b\}(dB) \quad (2)$$

where Pt represents the transmitting power, Pmax represents a maximum allowed uplink transmitting power, PL represents the downlink path loss estimate (in dB), and a represents a path loss compensation factor, which is usually indicated by the network side to the terminal device, and b represents other power control parameters, how to get b belongs to the prior art.

However, in the formula (2), it is assumed that the uplink path loss estimate and the downlink path loss estimate are the same, but in practical applications, the two are likely to be different, and therefore, the formula (2) needs to be improved.

In an embodiment, the terminal device may first determine the uplink path loss estimate according to the downlink path loss estimate, and further determine the transmitting power of the uplink signal according to the uplink path loss estimate.

For example, the network side may pre-configure a path loss offset value, and the terminal device may calculate the uplink path loss estimate according to the downlink path loss estimate and the path loss offset value.

In an embodiment, there may be:

$$PL\_UL = PL\_DL + k \qquad (3)$$

where PL_UL represents the uplink path loss estimate, PL_DL represents the downlink path loss estimate, and k represents the path loss offset value.

After the PL_UL is calculated according to the formula (3), the PL in the formula (2) can be replaced with the PL_UL, so as to calculate the Pt.

IV) The terminal device transmits the uplink signal according to the transmitting power.

After determining the transmitting power of the uplink signal, the terminal device may transmit the uplink signal according to the transmitting power.

In an embodiment, the terminal device may further determine a transmitting beam for transmitting the uplink signal according to the receiving beam used for receiving the target downlink signal, and then transmit the uplink signal by the transmitting beam.

For example, the receiving beamforming weight used for receiving the target downlink signal may be used as the transmitting beamforming weight for transmitting the uplink signal, to transmit the uplink signal.

In this way, the receiving beam used by the terminal device to receive the target downlink signal is enabled to be relatively consistent with the transmitting beam used for transmitting the uplink signal, so that the estimated downlink path loss is close to the uplink path loss, and thus the obtained downlink path loss can be used for uplink power control.

Up to this point, the introduction to the method embodiment shown in FIG. 1 has been completed.

In the method embodiment shown in FIG. 1, the solution of the present disclosure is mainly described from the terminal device side. For a network-side device, the network-side device may transmit the target downlink signal, so that the terminal device performs the downlink path loss estimation based on the target downlink signal, and determines the transmitting power of the uplink signal according to the result of the downlink path loss estimation.

Here, the target downlink signal is indicated by the network-side device to the terminal device through a downlink instruction.

In an embodiment, the network-side device may transmit first indication information to the terminal device, where the first indication information is used to indicate whether the terminal device uses the downlink path loss estimation to obtain the transmitting power of the uplink signal.

For example, the network-side device may indicate, through the first indication information, whether the terminal device uses the uplink path loss estimation or the downlink path loss estimation to obtain the transmitting power of the uplink signal.

As another example, the network-side device may indicate, through the first indication information, according to actual conditions, whether the terminal device can use the downlink path loss estimation to obtain the transmitting power of the uplink signal.

Then, the network-side device may transmit second indication information to the terminal device, where the second indication information is used to indicate the target downlink signal for performing the downlink path loss estimation.

The second indication information may carry index information of the target downlink signal.

For example, the network-side device may pre-configure multiple CSI-RS resources through a high-layer signaling, and indicate indexes of one or more CSI-RS resources for performing the downlink path loss estimation among them.

As another example, the network-side device may transmit a plurality of SS blocks and indicate an index of an SS block for performing the downlink path loss estimation among them.

The network-side device may indicate a plurality of target downlink signals for downlink path loss estimation, and the plurality of target downlink signals may be downlink signals of a same type and with different configurations, such as CSI-RSs or SSs, and may also include signals of different types, such as CSI-RS and MRS.

In addition, the network-side device may further pre-configure a plurality of downlink signals (for example, multiple CSI-RS resources) that may be used for downlink path loss estimation, or pre-agree a plurality of downlink signals (for example, SSs in multiple SS blocks transmitted at locations of agreed resources) with the terminal device, so that the terminal device can select at least one of the plurality of downlink signals as the target downlink signal.

When transmitting the target downlink signal, the network-side device may determine the transmitting beam used for transmitting the target downlink signal according to the receiving beam used for last receiving the uplink signal, and then use the transmitting beam to transmit the target downlink signal.

For example, the receiving beamforming weight used for last receiving the uplink signal may be used as the transmitting beamforming weight for transmitting the target downlink signal, to transmit the target downlink signal.

The terminal device may perform the downlink path loss estimation based on the target downlink signal to obtain a downlink path loss estimate, and determine a transmitting power of the uplink signal according to the downlink path loss estimate, and further, transmit the uplink signal according to the determined transmitting power, and correspondingly the network-side device receives the uplink signal transmitted by the terminal device.

The target downlink signal may include: a CSI-RS, an MRS, an SS, a PTRS, a DMRS, and the like.

The uplink signal may include: a PUSCH, a PUCCH, an SRS, and the like.

Different uplink signals can correspond to different target downlink signals.

For a specific implementation of the network-side device, reference may be made to the related description in the method embodiment shown in FIG. 1, and details are not described here again.

The above is a description of the method embodiments, and the solutions of the present disclosure are further described below through device embodiments.

Figure 2:
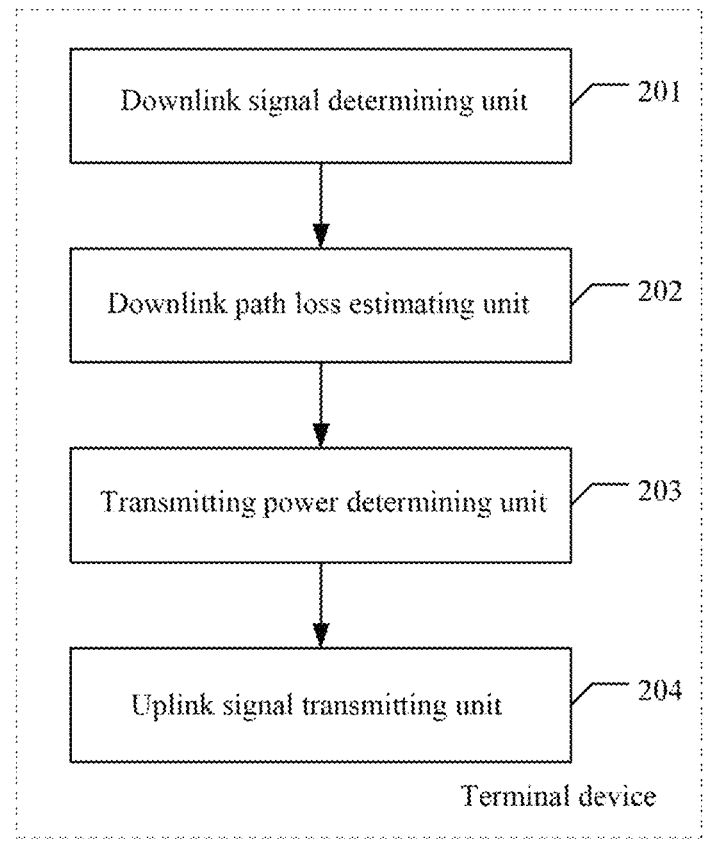
FIG. 2 is a schematic component structural diagram of an embodiment of a terminal device according to the present disclosure.

FIG. 2 is a schematic component structural diagram of an embodiment of a terminal device according to the present disclosure. As shown in FIG. 2, the terminal device includes: a downlink signal determining unit 201, a downlink path loss estimating unit 202, a transmitting power determining unit 203, and an uplink signal transmitting unit 204.

The downlink signal determining unit 201 is configured to determine a target downlink signal for performing a downlink path loss estimation.

The downlink path loss estimating unit 202 is configured to perform the downlink path loss estimation based on the target downlink signal to obtain a downlink path loss estimate.

The transmitting power determining unit 203 is configured to determine transmitting power of an uplink signal according to the downlink path loss estimate.

The uplink signal transmitting unit 204 is configured to transmit the uplink signal according to the transmitting power.

The target downlink signal may include: a CSI-RS, an MRS, an SS, a PTRS, a DMRS, and the like.

The uplink signal may include: a PUSCH, a PUCCH, an SRS, and the like.

Different uplink signals can correspond to different target downlink signals.

That is to say, in an actual application, when the terminal device determines the transmitting power of different uplink signals, different target downlink signals may be used for downlink path loss estimation and the like.

For example, the PUSCH signal and the PUCCH signal may respectively correspond to different target downlink signals.

The specific implementation of each unit shown in FIG. 2 will be described below.

a) The Downlink Signal Determining Unit 201

In an embodiment, the downlink signal determining unit 201 may first receive first indication information from a network side before determining the target downlink signal for performing the downlink path loss estimation, where the first indication information is used to indicate whether the terminal device uses the downlink path loss estimation to obtain the transmitting power of the uplink signal.

If the first indication information indicates that the terminal device uses the downlink path loss estimation to obtain the transmitting power of the uplink signal, the downlink signal determining unit 201 may further determine the target downlink signal for performing the downlink path loss estimation.

One way may be that the downlink signal determining unit 201 receives second indication information from the network side, and determines the target downlink signal for performing the downlink path loss estimation according to the second indication information.

The second indication information may carry index information of the target downlink signal, for indicating an index of the target downlink signal in a plurality of downlink signals that are pre-configured, so that the downlink signal determining unit 201 can know the target downlink signal for performing the downlink path loss estimation according to the index information.

For example, the network side may pre-configure multiple CSI-RS resources through the high-layer signaling, and indicate indexes of one or more CSI-RS resources for performing the downlink path loss estimation.

As another example, the network side may transmit multiple SS blocks and indicate an index of an SS block for performing the downlink path loss estimation among them.

The network side may indicate a plurality of target downlink signals for performing the downlink path loss estimation, and the plurality of target downlink signals may be downlink signals of a same type and with different configurations, such as CSI-RSs or SSs, and may also include signals of different types, such as CSI-RS and MRS.

Another way in which the downlink signal determining unit 201 determines the target downlink signal for performing the downlink path loss estimation is as follows: the downlink signal determining unit 201 measures M candidate downlink signals, and select N candidate downlink signals therefrom as target downlink signals according to a measurement result.

Here M is a positive integer greater than one and N is a positive integer less than or equal to M.

The M candidate downlink signals may be multiple downlink signals pre-configured by the network side for performing the downlink path loss estimation, for example, multiple CSI-RS resources.

Alternatively, the M candidate downlink signals may be multiple downlink signals that are pre-agreed with the network side, for example, SSs in multiple SS blocks transmitted at locations of agreed resources.

The downlink signal determining unit 201 can measure receiving quality of the M candidate downlink signals respectively, and select the N candidate downlink signals with best receiving quality therefrom as the target downlink signals.

Alternatively, the downlink signal determining unit 201 may measure receiving power of the M candidate downlink signals respectively, and select the N candidate downlink signals with largest receiving power therefrom as the target downlink signals.

The downlink signal determining unit 201 may report index information of the target downlink signal to the network side after selecting the N candidate downlink signals as the target downlink signals.

In addition, the downlink signal determining unit 201 may also report a measurement result of the target downlink signals to the network side while reporting the index information of the target downlink signals to the network side.

Further, the downlink signal determining unit 201 may report only the measurement result of the target downlink signals to the network side.

b) The Downlink Path Loss Estimating Unit 202

The downlink path loss estimating unit 202 may perform the downlink path loss estimation based on the determined target downlink signal to obtain a downlink path loss estimate.

For example, the downlink path loss estimating unit 202 may perform the downlink path loss estimation according to receiving power and transmitting power of the target downlink signal.

When the number of the target downlink signal is greater than one, the downlink path loss estimating unit 202 may calculate an average value of the receiving power of respective target downlink signals, and determine the downlink path loss estimate according to the average value and the transmitting power of each target downlink signal, or may determine a path loss estimate corresponding to each target downlink signal according to the receiving power and the transmitting power of each target downlink signal, and average the path loss estimates corresponding to the respective target downlink signals to obtain the downlink path loss estimate.

The transmitting power of the target downlink signal may be pre-notified by the network side to the downlink path loss estimating unit 202 through downlink signaling, for example, it is carried in configuration information of the CSI-RS resource and notified to the downlink path loss estimating unit 202.

Generally, when the number of the target downlink signal is greater than one, the transmitting power of multiple target downlink signals are the same, and may be different if necessary.

The path loss estimate is usually expressed in dB. Assuming the receiving power is P1 and the transmitting power is P2, the path loss estimate can be expressed as:

$$PL(\mathrm{dB})=10*lg(P1/P2)(\mathrm{dB}) \quad (1)$$

where PL is the path loss estimate.

The downlink path loss estimating unit 202 may also determine a receiving beam for receiving the target downlink signal according to a last determined beam for transmitting an uplink signal, and perform the downlink path loss estimation based on the received target downlink signal.

For example, the downlink path loss estimating unit 202 may use a beamforming weight used for last transmitting the uplink signal as a receiving beamforming weight for receiving the target downlink signal, and thereby measure the receiving power of the received target downlink signal to calculate the downlink path loss estimate.

As another example, the downlink path loss estimating unit 202 may also pre-determine a mapping relationship between a transmitting beam and a receiving beam, and determine the receiving beam according to the transmitting beam and the mapping relationship.

The downlink path loss estimating unit 202 may further determine, according to a transmitting beam used for transmitting an SRS on an SRS resource indicated by last received SRI information, a receiving beam for receiving the target downlink signal, and perform the downlink path loss estimation based on the received target downlink signal.

For example, the downlink path loss estimating unit 202 may determine, according to the SRI in the last received DCI scheduling uplink data, an SRS resource indicated by the SRI and the beamforming weight used for transmitting the SRS on the SRS resource, and use the weight as a receiving beamforming weight for receiving the target downlink signal, and thus measure the receiving power of the received target downlink signal to calculate the downlink path loss estimate.

In a practical application, the downlink path loss estimating unit 202 can also perform the downlink path loss estimation according to part of antenna ports of the target downlink signal, for example, perform the downlink path loss estimation according to one or two antenna ports of the target downlink signal.

c) The Transmitting Power Determining Unit 203

The transmitting power determining unit 203 may determine the uplink path loss estimate according to the downlink path loss estimate, and further determine the transmitting power of the uplink signal according to the uplink path loss estimate.

For example, the network side may pre-configure a path loss offset value, and the transmitting power determining unit 203 may calculate the uplink path loss estimate according to the downlink path loss estimate and the path loss offset value.

In an embodiment, there may be:

$$PL\_UL = PL\_DL + k \quad (3)$$

where PL_UL represents the uplink path loss estimate, PL_DL represents the downlink path loss estimate, and k represents the path loss offset value.

After the PL_UL is calculated according to the formula (3), the PL_UL can be used as the PL in the formula (2), and the Pt is calculated according to the formula (2), that is, the transmitting power of the uplink signal is calculated.

4) The Uplink Signal Transmitting Unit 204

After the transmitting power of the uplink signal is determined, the uplink signal transmitting unit 204 can transmit the uplink signal according to the transmitting power.

In an embodiment, the uplink signal transmitting unit 204 may further determine a transmitting beam for transmitting the uplink signal according to the receiving beam used for receiving the target downlink signal, and then transmit the uplink signal by the transmitting beam.

For example, the receiving beamforming weight used for receiving the target downlink signal may be used as the transmitting beamforming weight for transmitting the uplink signal, to transmit the uplink signal.

The above is an introduction to the embodiments of the terminal device, and a network-side device is also disclosed in the present disclosure.

Figure 3:
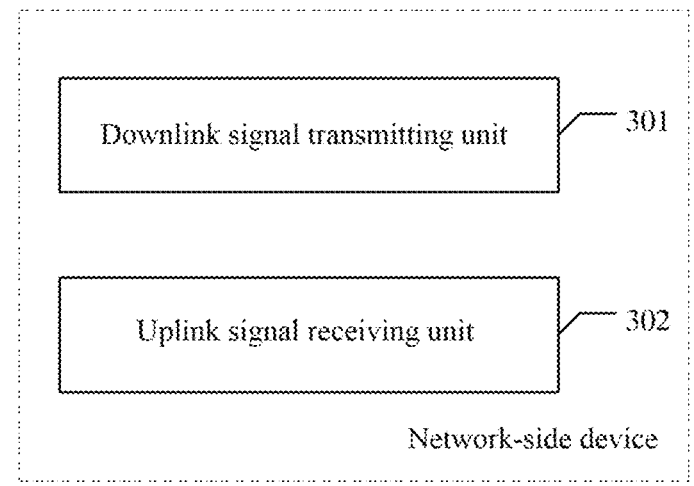
FIG. 3 is a schematic component structural diagram of an embodiment of a network-side device according to the present disclosure.

FIG. 3 is a schematic component structural diagram of an embodiment of a network-side device according to the present disclosure. As shown in FIG. 3, the network-side device includes: a downlink signal transmitting unit 301.

The downlink signal transmitting unit 301 is configured to transmit a target downlink signal, so that a terminal device performs a downlink path loss estimation based on the target downlink signal, and determines transmitting power of an uplink signal according to a result of the downlink path loss estimation.

The downlink signal transmitting unit 301 is further configured to indicate, through a downlink instruction, the target downlink signal to the terminal device.

In an embodiment, the downlink signal transmitting unit 301 can transmit first indication information to the terminal device before transmitting the target downlink signal, where the first indication information is used to indicate whether the terminal device uses the downlink path loss estimation to obtain the transmitting power of the uplink signal.

The downlink signal transmitting unit 301 may further transmit second indication information to the terminal device, where the second indication information is used to indicate the target downlink signal for performing the downlink path loss estimation.

The second indication information may carry index information of the target downlink signal.

For example, multiple CSI-RS resources may be pre-configured through a high-layer signaling, and indexes of one or more CSI-RS resources for performing the downlink path loss estimation may be indicated.

As another example, a plurality of SS blocks can be transmitted and an index of an SS block for performing the downlink path loss estimation among them can be indicated.

A plurality of target downlink signals may be indicated for downlink path loss estimation, and the plurality of target downlink signals may be downlink signals of a same type and with different configurations, such as CSI-RSs or SSs, and may also include signals of different types, such as CSI-RS and MRS.

When transmitting the target downlink signal, the downlink signal transmitting unit 301 may determine the transmitting beam used for transmitting the target downlink signal according to the receiving beam used for last receiving the uplink signal, and then use the transmitting beam to transmit the target downlink signal.

The terminal device may perform the downlink path loss estimation based on the target downlink signal to obtain a downlink path loss estimate, and determine a transmitting power of the uplink signal according to the downlink path loss estimate, and further, transmit the uplink signal according to the determined transmitting power.

Correspondingly, as shown in FIG. 3, the network-side device may further include: an uplink signal receiving unit 302.

The uplink signal receiving unit 302 is configured to receive the uplink signal transmitted by the terminal device.

The target downlink signal may include: a CSI-RS, an MRS, an SS, a PTRS, a DMRS, and the like.

The uplink signal may include: a PUSCH, a PUCCH, an SRS, and the like.

Different uplink signals can correspond to different target downlink signals.

For specific working process of the device embodiments shown in FIG. 2 and FIG. 3, reference is made to the corresponding description in the foregoing method embodiments, and details are not described here again.

The present disclosure also discloses an uplink power control system.

Figure 4:
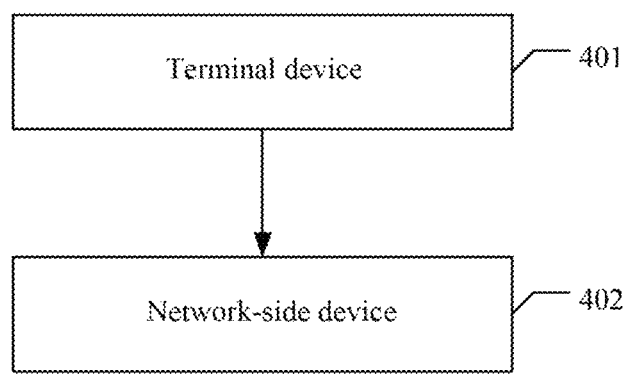
FIG. 4 is a schematic component structural diagram of an embodiment of an uplink power control system according to the present disclosure.

FIG. 4 is a schematic component structural diagram of an embodiment of an uplink power control system according to the present disclosure. As shown in FIG. 4, the uplink power control system includes: a terminal device 401 and a network-side device 402.

For a specific implementation of the terminal device 401, reference is made to the related description in the embodiment shown in FIG. 2, and for a specific implementation of the network-side device 402, reference is made to the related description in the embodiment shown in FIG. 3, and details are not described here again.

In the several embodiments provided by the present disclosure, it should be understood that the disclosed devices and methods and the like may be implemented in other manners. For example, the device embodiments described above are merely illustrative. For example, the division of the units is only a logical function division, and there may be another manner of division in an actual implementation.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or respective units may exist physically separately, or two or more units may be integrated into one unit. The above integrated unit can be implemented in the form of hardware or in the form of hardware plus software functional units.

The above-described integrated unit implemented in the form of software functional units can be stored in a computer readable storage medium. The above software functional units are stored in a storage medium and include instructions for causing a computer device (which may be a personal computer, a server, or a network device, etc.) or a processor to perform part of the steps of the methods of the various embodiments of the present disclosure. The foregoing storage medium includes various media that can store program codes such as a USB flash disk, a mobile hard disk, a read-only memory (ROM), a random access memory (RAM), a magnetic disk, or an optical disk, and the like.

The above are only the preferred embodiments of the present disclosure, and are not intended to limit the present disclosure. Any modifications, equivalents, improvements, etc., which are made within the spirit and principles of the present disclosure, should be included within the protection scope of the present disclosure.

The invention claimed is:

1. An uplink power control method, comprising:
   receiving, by a terminal device, first indication information from a network side, wherein the first indication information indicates whether the terminal device performs a downlink path loss estimation;
   if the first indication information indicates that the terminal device performs the downlink path loss estimation:
     determining, by the terminal device, a target downlink signal for performing the downlink path loss estimation;
     performing, by the terminal device, the downlink path loss estimation based on the target downlink signal to obtain a downlink path loss estimate; and
     determining, by the terminal device, transmitting power of an uplink signal according to the downlink path loss estimate;
   if the first indication information indicates that the terminal device does not perform the downlink path loss estimation:
     determining, by the terminal device, to use previously determined transmitting power as the transmitting power of the uplink signal;
   transmitting, by the terminal device, the uplink signal according to the transmitting power.

2. The method according to claim 1, wherein
the target downlink signal comprises at least one of: a Channel State Information Reference Signal (CSI-RS), a Mobility Reference Signal (MRS), a Synchronous Signal (SS), a Phase Tracking Reference Signal (PTRS), and a Demodulation Reference Signal (DMRS).

3. The method according to claim 1, wherein
the determining, by a terminal device, a target downlink signal for performing a downlink path loss estimation comprises:
receiving, by the terminal device, second indication information from the network side, and determining the target downlink signal according to the second indication information.

4. The method according to claim 1, wherein
the determining, by a terminal device, a target downlink signal for performing a downlink path loss estimation comprises:
measuring, by the terminal device, M candidate downlink signals, and selecting, from the M candidate downlink signals, N candidate downlink signals as target downlink signals according to a measurement result;
wherein M is a positive integer greater than one, and N is a positive integer less than or equal to M.

5. The method according to claim 4, wherein
after the selecting, from the M candidate downlink signals, N candidate downlink signals as target downlink signals, the method further comprises:
reporting index information of the target downlink signals and/or the measurement result to the network side.

6. The method according to claim 1, wherein
the performing, by the terminal device, the downlink path loss estimation based on the target downlink signal comprises:
performing, by the terminal device, the downlink path loss estimation according to receiving power and transmitting power of the target downlink signal.

7. The method according to claim 6, wherein
when the number of the target downlink signal is greater than one, the performing, by the terminal device, the downlink path loss estimation according to receiving power and transmitting power of the target downlink signal comprises one of the following:
calculating an average value of the receiving power of respective target downlink signals, and determining the downlink path loss estimate, according to the average value and the transmitting power of each target downlink signal; and determining a path loss estimate corresponding to each target downlink signal according to the receiving power and the transmitting power of each target downlink signal, and averaging path loss estimates corresponding to the respective target downlink signals to obtain the downlink path loss estimate.

8. The method according to claim 1, wherein the determining, by the terminal device, a target downlink signal for performing the downlink path loss estimation comprises:
determining, by the terminal device, a receiving beam for receiving the target downlink signal, according to a transmitting beam used for transmitting a Sounding Reference Signal (SRS) on an SRS resource indicated by latest SRS Resource Indication (SRI) information received;
the performing, by the terminal device, the downlink path loss estimation based on the target downlink signal comprises:
performing the downlink path loss estimation based on the target downlink signal that is received using the receiving beam.

9. The method according to claim 1, wherein the performing, by the terminal device, the downlink path loss estimation based on the target downlink signal comprises:
performing, by the terminal device, the downlink path loss estimation according to part of antenna ports of the target downlink signal.

10. The method according to claim 1, wherein the performing, by the terminal device, the downlink path loss estimation based on the target downlink signal comprises:
determining, by the terminal device, a receiving beam for receiving the target downlink signal, according to a latest determined beam for transmitting an uplink signal, and performing the downlink path loss estimation based on the target downlink signal that is received.

11. The method according to claim 1, wherein the uplink signal comprises: a Physical Uplink Shared Channel (PUSCH) signal, a Physical Uplink Control Channel (PUCCH) signal, and a Sounding Reference Signal (SRS); and different uplink signals correspond to different target downlink signals.

12. A terminal device, comprising: a processor and a computer-readable medium for storing program codes, which, when executed by the processor, cause the processor to:
receive first indication information from a network side, wherein the first indication information indicates whether the terminal device performs a downlink path loss estimation;
if the first indication information indicates that the terminal device performs the downlink path loss estimation:
determine a target downlink signal for performing the downlink path loss estimation;
perform the downlink path loss estimation based on the target downlink signal to obtain a downlink path loss estimate; and
determine, according to the downlink path loss estimate, transmitting power of an uplink signal;
if the first indication information indicates that the terminal device does not perform the downlink path loss estimation:
determine to use previously determined transmitting power as the transmitting power of the uplink signal;
transmit the uplink signal according to the transmitting power.

13. The terminal device according to claim 12, wherein the target downlink signal comprises: a Channel State Information Reference Signal (CSI-RS), a Mobility Reference Signal (MRS), a Synchronous Signal (SS), a Phase Tracking Reference Signal (PTRS), and a Demodulation Reference Signal (DMRS).

14. The terminal device according to claim 12, wherein the program codes further cause the processor to receive second indication information from the network side, and determine the target downlink signal for performing the downlink path loss estimation according to the second indication information;
wherein the second indication information carries index information of the target downlink signal, for indicating an index of the target downlink signal in a plurality of downlink signals that are pre-configured.

15. The terminal device according to claim 12, wherein the program codes further cause the processor to measure M candidate downlink signals, and select, from the M candidate downlink signals, N candidate downlink signals as target downlink signals according to a measurement result;
wherein M is a positive integer greater than one, and N is a positive integer less than or equal to M.

16. The terminal device according to claim 15, wherein the program codes further cause the processor to:
report, after the N candidate downlink signals are selected as the target downlink signals, index information of the target downlink signals and/or the measurement result to the network side.

17. The terminal device according to claim 12, wherein the program codes further cause the processor to perform the downlink path loss estimation according to receiving power and transmitting power of the target downlink signal.

18. The terminal device according to claim 17, wherein when the number of the target downlink signal is greater than one, the program codes further cause the processor to perform one of the following:
calculating an average value of the receiving power of respective target downlink signals, and determining the downlink path loss estimate, according to the average value and the transmitting power of each target downlink signal; and
determining a path loss estimate corresponding to each target downlink signal according to the receiving power and the transmitting power of each target downlink signal, and averaging path loss estimates corresponding to the respective target downlink signals to obtain the downlink path loss estimate.

19. The terminal device according to claim 12, wherein the program codes further cause the processor to determine a receiving beam for receiving the target downlink signal, according to a transmitting beam used for transmitting a Sounding Reference Signal (SRS) on an SRS resource indicated by latest SRS Resource Indication (SRI) information received, and perform the downlink path loss estimation based on the target downlink signal that is received.

20. The terminal device according to claim 12, wherein the program codes further cause the processor to perform the downlink path loss estimation according to part of antenna ports of the target downlink signal.

\* \* \* \* \*